US005488687A

United States Patent [19]

Rich

[11] Patent Number: 5,488,687

[45] Date of Patent: Jan. 30, 1996

[54] DUAL RESOLUTION OUTPUT SYSTEM FOR IMAGE GENERATORS

[75] Inventor: Henry H. Rich, Raleigh, N.C.

[73] Assignee: Star Technologies, Inc., Sterling, Va.

[21] Appl. No.: 946,082

[22] Filed: Sep. 17, 1992

[51] Int. Cl.[6] .......... G06T 1/60

[52] U.S. Cl. .......... 395/164; 395/135

[58] Field of Search .......... 395/123, 132, 395/152, 164, 135

[56] References Cited

U.S. PATENT DOCUMENTS 5,025,394 6/1991 Parke .......... 395/152

5,239,625 8/1993 Bogart et al. .......... 395/128

5,241,659 8/1993 Parulski et al. .......... 395/164

*Primary Examiner*—Mark K. Zimmerman

*Attorney, Agent, or Firm*—Douglas M. Clarkson

[57] ABSTRACT

An image generator with a system to affix a flag for identifying high resolution pixel data in a signal of both high and low resolution pixel data, so that high resolution pixel data is divided readily for separate treatment in a high resolution frame buffer. The low resolution pixel data is connected to a low resolution frame buffer where it is treated with an occlusion mask in accordance with occlusion fractional coverage computed separately. The pixel data is combined again in a mixer before it is converted for visual display.

10 Claims, 4 Drawing Sheets

DUAL RESOLUTION OUTPUT SYSTEM FOR IMAGE GENERATORS

BACKGROUND OF THE INVENTION

FIELD OF THE INVENTION

The present invention, generally, concerns computer graphic systems and, more particularly, relates to a new and improved image generator to produce images in real time more realistically and at less expense.

Image generators are digital computer graphics systems used to produce imagery for real time training, such as flight simulation, and for amusement and other applications. Image generators produce perspective images from stored mathematical descriptions of objects, usually polygon approximations to the shapes of real objects.

The image generator produces discrete color samples, called pixels, that form a rectangular two-dimensional output image. The image is typically converted to a video raster to drive a cathode ray tube or other display.

The number of pixels in each row and column of the display determines the maximum possible resolution of the image. High resolution is critical to many of the applications of visual simulation.

For military simulations, the resolution determines the range at which targets may be detected in the simulator. Usually, the resolution afforded by the simulator is less than that of the human eye, so that training is impaired by reduced detection and recognition distances.

In commercial flight simulation, pilots would like sufficient resolution to identify runway stripes, markings and lights at the same distances as in the real world. Again this places a premium on the resolution of the image generator.

Unfortunately, the cost of an image generator increases significantly as the resolution of its output increases. Typically, one-half to two-thirds of the cost of an image generator is associated with generating pixels.

Doubling the resolution (both horizontally and vertically) requires four times as many pixels be generated per unit time. Consequently, that part of the image generator is made approximately four times as expensive. Overall, the image generator becomes 2.5 to 3 times as expensive.

One of the attempted solutions to the problem of increased cost is called "target insetting." This solution uses a projector that portrays moving military targets, typically enemy aircraft, at high resolution, while the non-target background imagery is projected separately at lower resolution.

The term "target" is used here to mean any object of special interest with respect to its detection, recognition, or identification. This would include, for example, runway features in a commercial airline simulator or air traffic in a simulator to train control tower operators.

A target projector must be moved by a servo-mechanism, so that a target is placed in a correct position relative to the background image as the target is moved about in the scene. Sometimes a circular portion of the background image is darkened electronically to accept such an inset target image, and other times, the target is projected significantly brighter than the background imagery.

Electromechanical target insetting is virtually impossible to accomplish with such precision that the inset is imperceptibly different from the background in both color and illumination. Consequently, there is a potential problem in a trainee being able to detect the insetting artifact and, subsequently the target, more easily than the target resolution alone otherwise would allow.

The cost of an electromechanical mechanism for such a target projector is substantial, and therefore, it is difficult to justify the cost premium of high resolution in this form of image generator.

OBJECTS AND SUMMARY OF THE INVENTION

Therefore, it is an object of the invention to provide a non-mechanical means of incorporating targets into an image generator scene at a high resolution.

It is a further object of the invention to provide a means of incorporating targets at high resolution more economically than by generating the entire scene at a high resolution.

It is also an object of this invention to provide means for including a target in an image generator scene such that there is a minimum of artifacts to draw attention to the target position and so that such a target is occluded visually in a realistic manner.

Briefly, the present invention includes a system for an image generator whereby a frame buffer circuit divides a signal into a high resolution component and a low resolution component. The output of such a frame buffer circuit is connected through an address and control logic circuit to a mixer circuit for combining the two signal components before they are connected to a circuit to generate an output video signal.

BRIEF DESCRIPTION OF THE DRAWINGS

Other objects, features and advantages of the present invention will become apparent as the following description proceeds and upon reference to the drawings in which.

DESCRIPTION OF THE PREFERRED EMBODIMENT

Figure 1:
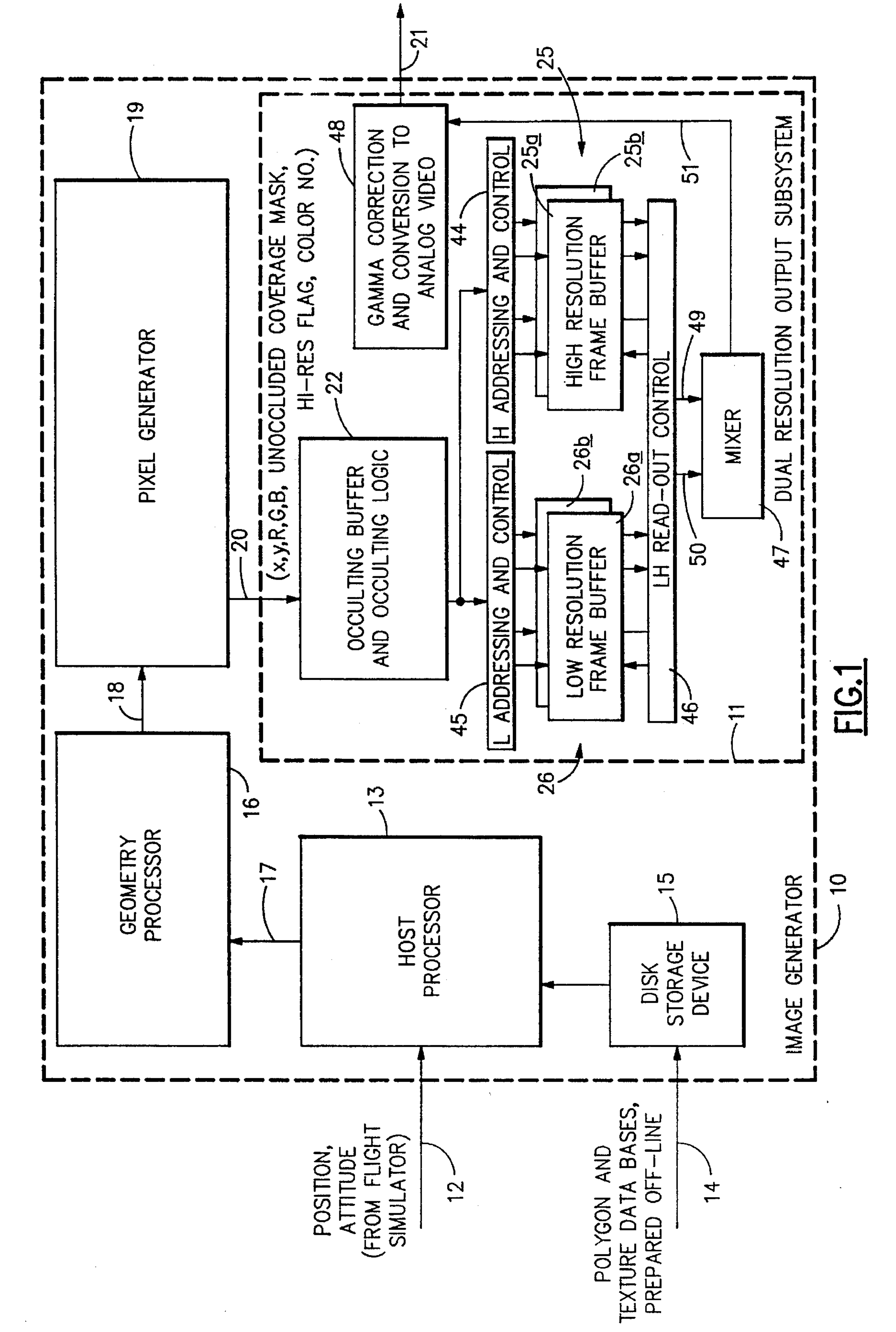
FIG. 1 a block diagram of a dual resolution output system that is arranged according to the principles of the present invention

Referring to FIG. 1, an image generator 10 is shown with a system 11 arranged in accordance with the invention connected to receive position and attitude data from a flight simulator over an interface 12 for use by a host processor 13. The host processor 13 accesses polygon and texture data by a connection 14, such data being prepared off-line and stored by a memory storage device 15.

The image generator 10 contains a geometry processor 16 which receives a list of potentially visible polygons over an interface 17 from the host processor 13. The geometry processor 16 tranforms polygons from three dimensional database coordinates to two dimensional screen coordinates.

The screen coordinate polygons are connected by an interface 18 to a pixel generator 19, that subsequently converts each polygon into pixel data. The final stage of processing this pixel data in accordance with the invention is a dual resolution output subsystem 11 that receives pixel data from the pixel generator 19 over an interface 20 and, ultimately, outputs an analog video signal 21 for display.

In FIG. 1, the pixel generator 19 generates a high resolution flag signal also, which is a single bit signal that indicates which data should be rendered at high resolution. The present invention in its preferred embodiment also requires a color number, nominally 6 bits, that addresses a predetermined table of colors to yield the color of the high resolution pixels. This color number preferably is sent only when the number changes.

The high resolution flag and the color number are stored in the memory storage device 15 and retrieved by the host processor 13 and connected through the graphics pipeline ultimately to the interface 20 for use by the dual resolution output system 11.

The output of the pixel generator 19 include the x and y screen address coordinates of the pixel data, the color components of the pixel data (typically 8 bits each of red, green and blue data) and an unoccluded coverage mask, typically 16-bits. The screen address coordinates determine the location of the pixel data for the display screen, the x coordinate giving the pixel position from left to right across the screen and the y coordinate giving the line count down from the top of the screen.

When used with the system 11 of the invention, the screen address is that of the low resolution image, each pixel of which corresponds to a block of four high resolution pixels. Each set of pixel data sent by the pixel generator 19 over the interface 20 corresponds to a piece of a single polygon from the data base.

Accordingly, if the pixel is from an edge of the polygon, in general it will not be covered completely. The unoccluded coverage mask summarizes which portions of the pixel are covered by the polygon.

Figure 2:
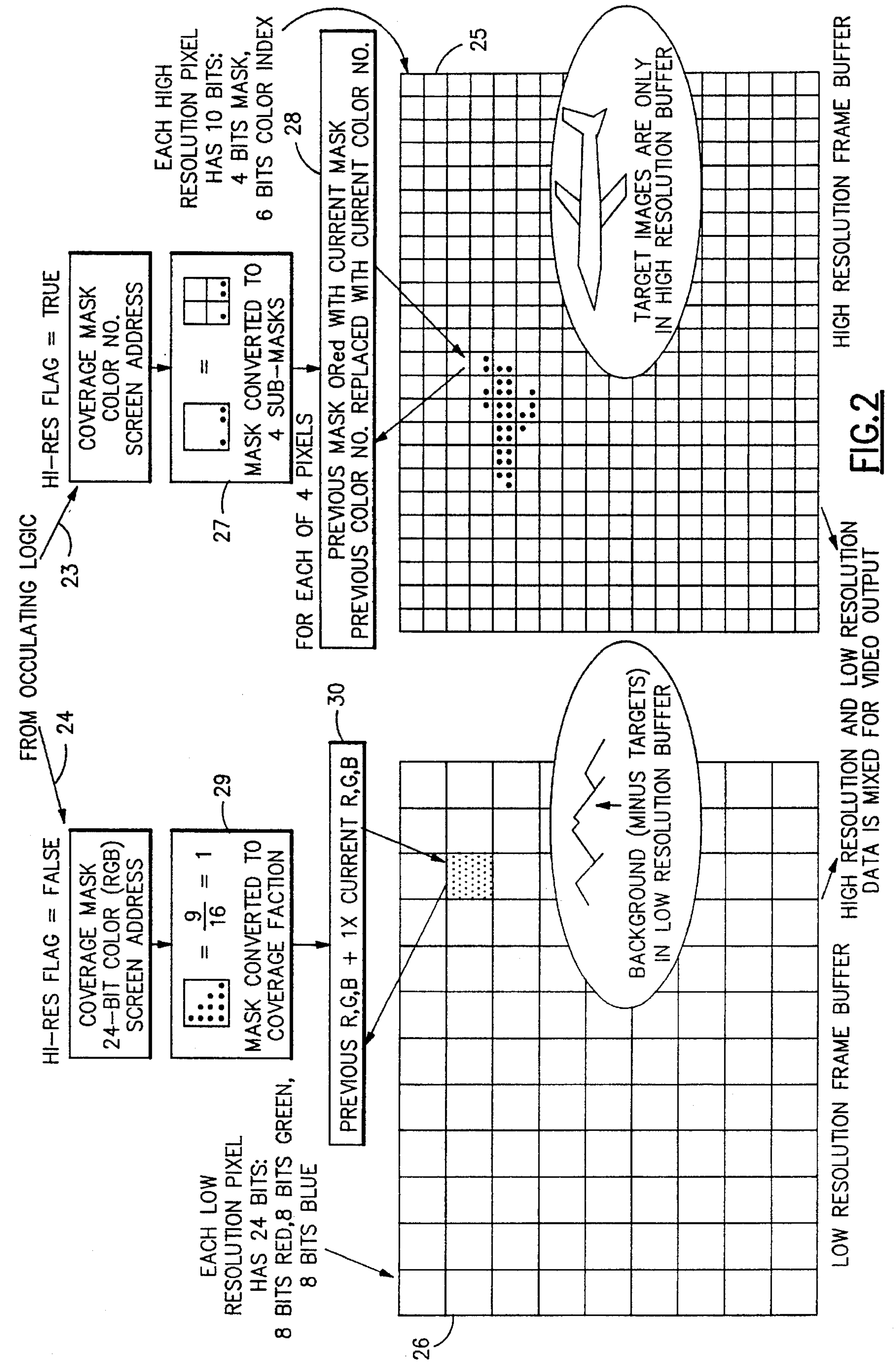
FIG. 2 is a diagrammatic illustration of the present invention illustrating its frame buffer operations.

FIG. 2 provides a diagrammatic overview of the dual resolution processing of the present invention. This overview is intended to facilitate the more detailed description that follows.

With reference to FIG. 2, after an occulting logic buffer 22, FIG. 1, control and data signals are connected either for high resolution processing, indicated by the numeral 23, or for low resolution processing, indicated by the numeral 24, depending upon a resolution flag generated by the pixel generator 19. High resolution processing leads to building up an image of the targets only in a high resolution frame buffer 25.

Low resolution processing builds up the background image in a low resolution buffer 26. However, these images are not completely independent of each other, because both are subject to the same occulting logic 22, FIG. 1, which removes any parts of the target that are concealed by terrain or other objects in the low resolution image.

For the high resolution processing 23, the common sixteen bit coverage mask is subdivided into four 4-bit masks, indicated by the numeral 27. Because targets appear small and also generally covered by atmospheric haze when portrayed at high resolution, the accuracy of their color rendition is not as important as it is when they are large.

Consequently, rather than storing a full 24-bit color description with each high resolution pixel, it suffices to store a 6-bit number that addresses a color in a predetermined table. Having 4-bits for storage of the mask and 6-bits for the color number, the high resolution buffer 25 is only 10-bits deep.

Control logic 28 for the high resolution buffer 25 performs the updating of the buffer with new data. For each of the four high resolution pixels in a block corresponding to a low resolution pixel whose address was specified in the new data, a 4-bit mask from the new data is ORed with the mask data previously in the pixel, and the previous color number is replaced with the new color number.

It is an approximation to just replace the old color number with a new one, rather than using a weighted average based upon the mask coverage. The approximation is justified, however, due to the small size and subdued color contrasts typifying target objects, and it simplifies the implementation substantially.

It has been discovered through experimentation with the system that rather than replace the old color code with the new one, good results are achieved if the new color code is ORed with the old one. Color codes are prearranged so that the ORed combinations are in rough correspondence to values of intermediate colors.

ORing in the mask of the most recently received polygon data provides correct occlusion if target polygons are written in order from the most distant to the nearest. However, for the same reasons that color errors are not very significant for targets, the occlusion order of similarly colored distant targets relative to each other is not likely to cause an error that is noticeable.

As described previously, target-to-background occlusion is always correct; only target-to-target occlusion is approximated.

For low resolution processing 24, the common 16-bit coverage mask is converted to a coverage fraction, f, indicated by the numeral 29. If m of the n bits in the mask are set to 1's, then f=m/n. In this case, there are 16 sample points in the mask, n=16. If, for example, 9 of them are set, then f=9/16 of the pixel is covered by the visible portion of the current data.

Because the low resolution buffer 26 contains all the scene's objects except targets, no safe assumptions can be made about color contrast being restricted. A full 24-bit color value is stored, therefore, for each pixel in the frame buffer 26.

Control logic, indicated by the numeral 30, for the low resolution buffer 26, performs the updating of the buffer with new data. Previously stored color data is read out of the buffer from the address specified with the new data.

For each of the three color components of the pixel, the new color component is multiplied by f and added to previously stored value. Then, the sum is stored back in the frame buffer. The occulting logic 22, FIG. 1, ensures that all of the fractions sum exactly to one, so that the sum of the weighted color contributions corresponds to the correct value for the color of the pixel.

Both the high and the low resolution frame buffers 25 and 26, FIG. 2, are filled with exactly the right data needed for correctly mixing the two images for output. The targets are occluded before they are written into the high resolution buffer 26, so that when the masks stored in the buffer 26 are used to determine the fraction of the target pixels to use in the combined output, the results will show correct occlusion.

The targets are not written into the low resolution buffer 26. If the target were in both low and high resolution buffers, mixing according to the visibility mask would produce too much of the target color in the final output. However, as it is, the fraction of the target color is added only once, which yields the correct results in the output.

The dual resolution output subsystem 11, FIG. 1, provides a substantial processing efficiency in comparison with computing all pixels at high resolution. One reason is that because targets appear small due to their distant perspective, very few high resolution pixels need to be computed and processed in the dual resolution system 11.

Moreover, even minimal processing costs are reduced through use of approximations appropriate to target characteristics. With processing costs so reduced, the principal cost of a system constructed and arranged according to the invention is primarily the memory required for the high resolution frame buffer 25.

Here again, the appropriate approximation of using indexed color to reduce the bits required for color storage from twenty four to six per pixel is performed in the high resolution buffer. Even with four bits added for the mask, the high resolution buffer is less than twice the size of the low resolution buffer in terms of total bits stored while providing four times the resolution.

Now, details of the preferred embodiment of the invention will be described in two parts, (1) filling the frame buffers 25 and 26, and (2) then mixing them to produce the video output 21.

Figure 3:
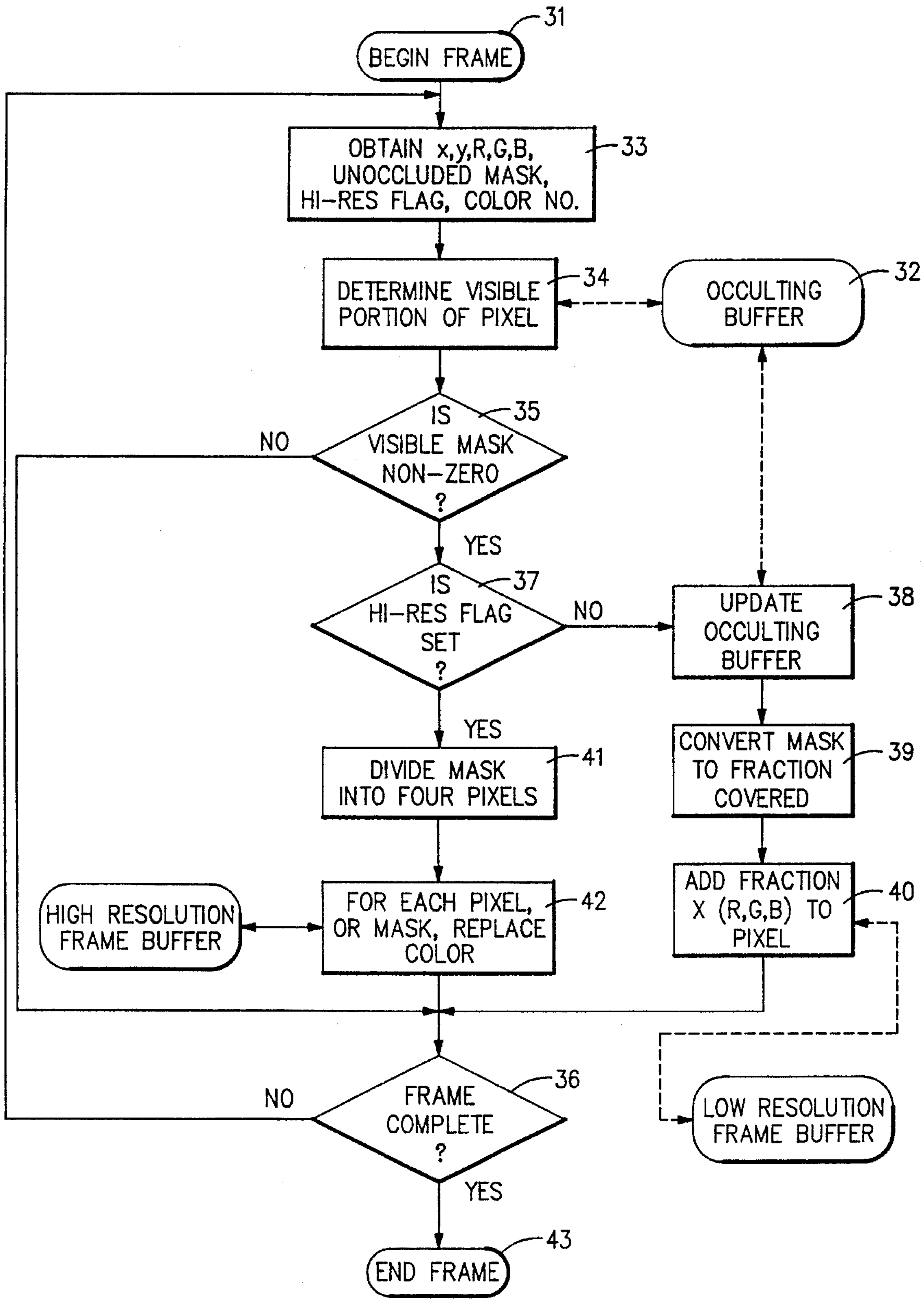
FIG. 3 is a detailed flow chart of the steps involved in generating dual resolution imagery in two frame buffers.
Figure 4:
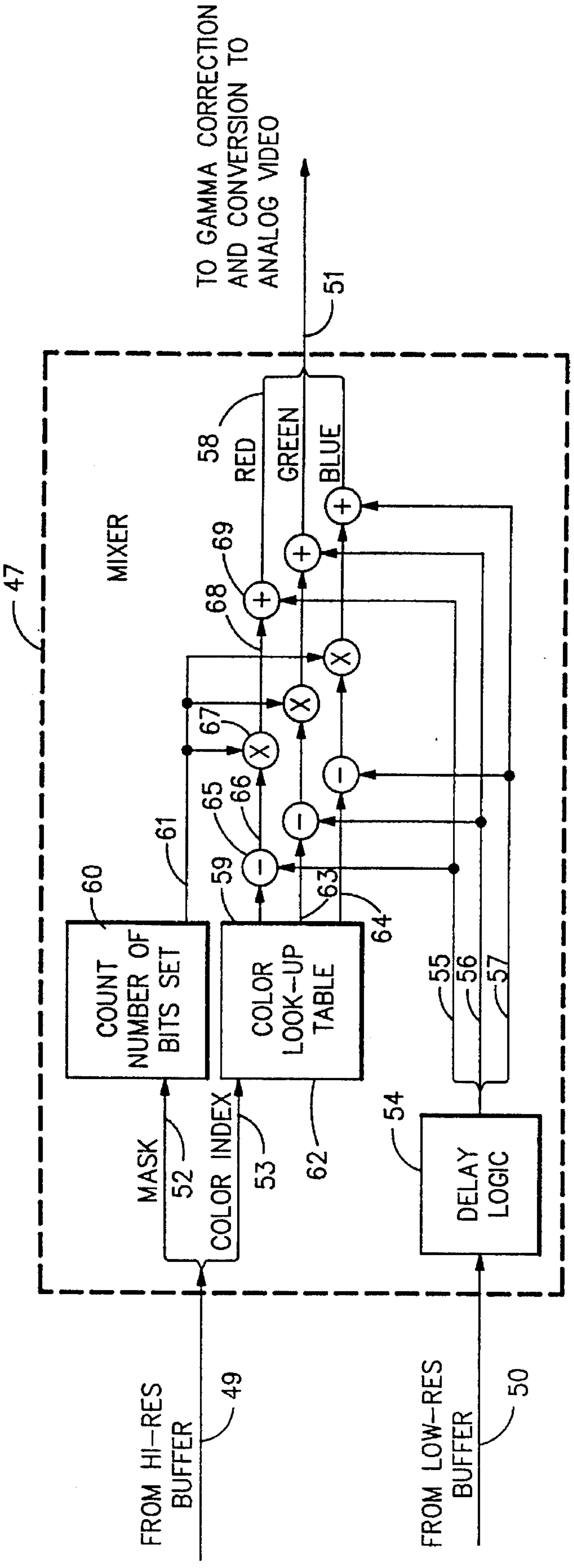
FIG. 4 is a detailed block diagram of a mixer circuit in accordance with the present invention as used for combining the high and the low resolution signals into a single output image.

Referring to FIG. 4, the flow chart illustrates the processing that is required within the dual resolution output system 11 for entering data into the high resolution and the low resolution frame buffers 25 and 26. At the start of a frame, indicated by block 31, the high resolution frame buffer 25 is cleared to all zeroes, the low resolution frame buffer 26 is cleared to all zeroes or to a background color and the occulting buffer 22 is cleared to all zeroes, indicated by block 32, FIG. 3.

After starting a frame, pixel data is read, indicated by the block 33, from the pixel generator 19 over the interface 20. The pixel data, then, is processed, block 34, with reference to data stored previously in the occulting buffer 22, block 32, to determine which, if any portions of the pixel are visible.

The occulting algorithm varies depending upon details of the architecture, which is not a part of the present invention. One proven method processes data such that pixels from polygons nearer the eyepoint always appear in the video scene before the more distant ones which they occlude. The input mask is XORed with the previous contents of the occulting buffer for that pixel to obtain the portion that is visible.

Whatever the occulting algorithm, the result is to convert the unoccluded input mask to an occluded mask. The occluded mask then corresponds to the portions of the pixel that are visible in the final scene.

The next step, indicated by block 35 in FIG. 3, typically, is to check whether the occluded mask is non-zero. If the pixel is completely covered so that nothing will appear in the final image, the processing passes directly to checking for a completed frame, block 36, and if not complete, the process returns to block 33.

If the occluded mask is non-zero, the answer is "Yes" in block 35, and the process proceeds to check whether a high resolution flag is set, block 37. If the data is for the high resolution buffer 25, i.e., it is a target, a high resolution flag is the basis for this determination.

If the high resolution flag is not set, the next step is to update the occulting buffer, block 38. For the occulting algorithm used as an example above, updating the occulting buffer is accomplished by ORing the visible mask with the previous mask in the occulting buffer 22, FIG.1. Note that the occulting buffer is not updated if the pixel is destined for the high resolution buffer.

This processing subtly results in the targets being occluded by the background data while a complete background image is built in the low resolution buffer 26. Not updating the occulting buffer for targets also results in a later need to store mask data, along with the color data, in the high resolution buffer 25, FIG. 1.

Continuing with the low resolution processing, after updating the occulting buffer, block 38, the occluded coverage mask is converted to the fraction, f, of the sample points set to 1's within the mask, block 39. The low resolution frame buffer 26 then is updated, block 40, by adding the fractionally weighted new color components to the color components previously in the low resolution buffer 26. Then, check for a completed frame, block 36.

If a high resolution flag was set, the answer to block 37 is a "Yes", and the occluded coverage mask is divided into four parts, corresponding to high resolution pixels, block 41. Each of the four new high resolution pixel masks is ORed into the corresponding mask of the high resolution buffer 25, and the old color number in the high resolution is replaced with the new one, block 42. Now, check for a completed frame, block 36.

If the frame is not complete, the complete frame check, block 36, returns the process to the next input pixel data, block 33.

If the frame is complete, the check at block 36 proceeds to an end-of-frame indication, block 43. Both the high resolution and the low resolution buffers 25 and 26, FIG. 1, are double buffers so that half of each can be lead out for display while the other half is written with new data. The roles of the buffer halves are toggled at the end of each frame.

The processing steps in FIG. 3 are associated with hardware parts in the implementation. For example, the processing steps 33, 34, 35, 37, 38, and 43 together with the occulting buffer at block 32, form the Modified Occulting Buffer and Occulting Logic 22 in FIG. 1.

The processing steps 41 and 42 form the H Addressing and Control Logic 44. The processing steps 39 and 40 make up the L Addressing and Control Logic 45 in FIG. 1.

The two halves of the double buffers for the high resolution buffer 25 are identified by the numerals *25a* and *25b* in FIG.1. Similarly, the two halves of the low resolution buffer 26 are shown as *26a* and *26b*.

In general, the frame buffers 25 and 26 are interleaved for greater processing speed, necessitating additional control and routing logic. However, such control and routing logic is well established in art and, therefore, details will not be described.

Turning now to the buffer read-out and display processing, first with reference to FIG. 1, the LH read-out control 46 sequences the addresses to the output halves of the low resolution frame buffer 26 and the high resolution frame buffer 25. The digital pixel data corresponding to the same address in these two buffers appears concurrently at the input to a mixer 47.

The mixer 47 combines the two pixel data signals to provide a single stream of red, green, blue component data at the high resolution rate. The gamma correction and conversion to analog video 52 subsequently corrects for non-linearities in the displays, converts the digital data to analog, generates synchronization signals and provides video output drive to the displays.

In FIG. 4 of the drawings, the mixer 47 receives digital pixel data from the high resolution buffer 25 on an input 49 and receives digital pixel data for the corresponding pixel in the low resolution buffer 26 on an input 50. The mixer 47 outputs digital color component data to the gamma correction and digital-to-analog video circuit 48, FIG. 1, over an output connection 51.

The input data is in the format with which it was stored in the buffers 25 and 26. The high resolution data on the input 49 has a 4-bit mask signal component on a connection 52 and a 6-bit color index signal component on a connection 53.

The low resolution data on the input 50 has 24-bits. Since each low resolution pixel is used four times, once for each of the four corresponding high resolution pixels, a delay logic 54 is connected to receive and hold the pixel data at the input 50.

In the preferred embodiment, the data at the input 50 is held by the delay logic 54 for two clock intervals on each of two successive read-outs of the low resolution scanline, i.e., horizontal line of pixels. After the delay logic 54, the 24-bit data is separated into individual red 55, green 56, and blue 57 color components.

The mask signal component on the connection 52 determines how much of each high resolution pixel is covered by polygons from a target. If the mask is empty, i.e. all bits are zero, then there is no target data in the pixel and the color of the pixel output 51 is identical to the low resolution data.

If three of the four bits are set, then the output is three-fourths high resolution color and one-fourth low resolution, and so forth. In general, if m of the bits in the mask are set, the fraction of high resolution data is g=m/4.

Then, for each color component, the equations to compute the color fraction are as follows:

$$\text{color\_out} = g \times \text{color\_hires} + (1-g) \times \text{color\_lores} \quad (1)$$

$$= \text{color\_lores} + g \times (\text{color\_hires} - \text{color\_lores}) \quad (2)$$

Where:

"color—out"=the output color component on an output connection;

"color—lores"=the fraction of a low resolution pixel's color component; and

"color—hires"=the fraction of a high resolution pixel's color component.

In these equations, the equation (2) is preferred to (1) for implementation. For the color RED, red—out is the output red color component on the connection 58, FIG. 4, red—lores is the low resolution pixel's red color component 55 and red—hires is the high resolution pixel's red color component on connection 59.

A logic block 60 receives the mask data on connection 52 and connects the count of the number of bits set as a fraction, g, of the total on an output 61. Since there are only 16 possible input patterns, a table look-up is an appropriate means of implementing this function.

Concurrently, the color index data on the connection 53 is used to address the color look-up table 62 to obtain 8-bit color components for the high resolution pixel, red 59, green 63 and blue 64. The color look-up table 62 is predetermined off-line and downloaded by the host processor 13 for the simulation data base signals on the input 14 used by the image generator 10.

Comparing FIG. 4 to the equation (2), the subtractor 65 computes (red—hires-red—lores), from the inputs 59 and 55, respectively, and supplies the difference as an input to a multiplier 67. This multiplier's other input 61 is the fraction g.

The output 68 of the multiplier 67 is g×(red—hires-red—lores). Finally, the output 68 of the multiplier is input to an adder 69 with its other input the high resolution red component, red—hires 59, to yield the red—output 58 in accordance with equation (2).

The multipliers, adders, and subtractors must each maintain a minimum of 8-bit precision in the processing. The green and blue output components are computed with logic identical to the red.

The dual resolution output subsystem is implemented preferably with standard video random access memory (VRAMS) and with commercial semi-custom integrated circuit technology, such as the gate array products offered by LSI Logic, Inc.

The invention as described has been implemented with this technology and performs successfully. Operation of the device also verifies the appropriateness of the various assumptions, including the color accuracy requirements, made in the course of the design.

It is understood that the number of sample points in the occlusion mask, the number of high resolution pixels per low resolution pixel, the choice of RGB as the color space, and so forth, are parameters of the design within the scope of the invention. Different parameter choices are appropriate for different instances of use of the invention.

Presently, for real time situations, technology dictates that all, or nearly all, of the processing be performed in hardware. Non-real-time applications or advanced technology can admit of implementation of all or part of the invention with programmable processors.

While the invention has been described with respect to the structure disclosed, it is not confined to the details set forth, but is intended to cover such modifications or changes as may come within the scope of the following claims.

What is claimed is:

1. In an image generator for producing pixel data with occluded and unoccluded portions having pixel color components and to produce target pixels with a high resolution flag and a color number, a real time output system of said image generator comprising:

occulting logic means for receiving pixel data with unoccluded portions and with color components and with high resolution flag means and with color identifying numbers for generating output occluded pixels and pixel fragments;

high resolution frame buffer means and low resolution frame buffer means connected to receive said output pixels and pixel fragments of said occulting logic means and mixer circuit means for performing color table, weighting and delay logic functions, and connected to receive output data of said high and low resolution frame buffer means for combining said output data for developing data for display;

wherein output pixels and pixel fragments from the occulting logic means are selectively provided to either the high resolution frame buffer means or the low resolution frame buffer means in response to said flag means.

2. An image generator with an output system as defined by claim 1 wherein said occulting logic means includes means for producing, for said low resolution pixel data, an occlusion mask indicative of fractional coverage of said pixel data for use by said mixer circuit means.

3. An image generator with an output system as defined by claim 2 wherein said occulting logic means includes means for producing, for said low resolution pixel data, a fractional coverage portion for each color component according to an amount of occlusion involved with each of said low resolution pixel data for use by said mixer circuit means.

4. An image generator with an output system as defined by claim 1 wherein said occulting logic means includes buffer means for said unoccluded portions of said pixel data.

5. An image generator with an output system as defined by claim 1 including read-out control logic means connected to receive output pixel data from both of said frame buffer means.

6. An image generator with an output system as defined by claim 1 including address and control means connected to receive said output of said occulting logic means for connecting said output of said occulting logic means to said high resolution frame buffer means and to said low resolution frame buffer means.

7. An image generator with an output system as defined by claim 6 wherein said mixer circuit means combines said high resolution pixel data and said low resolution pixel data to form a high resolution output signal.

8. An image generator with an output system as defined by claim 7 including digital-to-analog conversion logic means connected to receive said output signal from said mixer circuit means to generate a video signal for a visual display.

9. An image generator with an output system as defined by claim 1 wherein said occulting logic means includes means for producing an occlusion mask indicative of fractional occlusion of said low resolution pixel data, means for producing a fractional color component indicative upon an occlusion fraction of said low resolution pixel data, buffer means for said unoccluded pixel data, and address and control means connected to receive pixel data from said occulting logic means.

10. An image generator with an output system as defined by claim 9 including circuit means to compute a color fraction for each color component in said high resolution data input signals in accordance with the relationship:

color_lores+g×(color_hires—color_lores)

where:

color_lores=a fraction of low resolution color component for a pixel;

color_hires=a fraction of high resolution color component for a pixel;

g=an occlusion fraction for a pixel of high resolution data.

* * * * *